United States Patent [19]

Edwards

[11] Patent Number: 4,871,379
[45] Date of Patent: Oct. 3, 1989

[54] MODULAR, SHELL-LESS, AIR PERMEATOR

[75] Inventor: Donald W. Edwards, Wilmington, Del.

[73] Assignee: E. I. Du Pont De Nemours and Company, Wilmington, Del.

[21] Appl. No.: 136,845

[22] Filed: Dec. 22, 1987

[51] Int. Cl.$^4$ .............................................. B01D 53/22
[52] U.S. Cl. ............................................ 55/158; 55/16
[58] Field of Search ........................... 55/16, 158, 189

[56] References Cited

U.S. PATENT DOCUMENTS

| | | | |
|---|---|---|---|
| 2,597,907 | 5/1952 | Steiner et al. | 55/158 |
| 2,961,062 | 11/1960 | Hunter et al. | 55/158 |
| 3,369,343 | 2/1968 | Robb | 55/158 X |
| 3,616,928 | 11/1971 | Rosenblatt | 55/158 X |
| 3,738,813 | 6/1973 | Esmond | 55/158 X |
| 3,832,830 | 9/1974 | Gerow | 55/158 |
| 4,225,439 | 9/1980 | Spranger | 55/158 X |
| 4,342,723 | 8/1982 | Sado et al. | 55/158 X |
| 4,349,440 | 9/1982 | Esmond | 55/158 X |
| 4,556,180 | 12/1985 | Manatt | 55/158 X |
| 4,568,579 | 2/1986 | Watson | 428/35 |
| 4,666,469 | 5/1987 | Krueger et al. | 55/158 X |

FOREIGN PATENT DOCUMENTS

| | | | |
|---|---|---|---|
| 108426 | 5/1984 | European Pat. Off. | 55/158 |
| 108843 | 5/1984 | European Pat. Off. | 55/158 |
| 0204424 | 12/1986 | European Pat. Off. | |
| 2150241 | 4/1973 | Fed. Rep. of Germany . | |
| 51183 | 5/1978 | Japan | 55/158 |
| 103520 | 5/1986 | Japan | 55/158 |
| 192308 | 8/1986 | Japan | 55/158 |
| 247606 | 11/1986 | Japan | 55/158 |
| 2022457 | 12/1979 | United Kingdom . | |
| 2122103 | 1/1984 | United Kingdom . | |

Primary Examiner—Robert Spitzer
Attorney, Agent, or Firm—Frank C. Hilberg, Jr.

[57] ABSTRACT

Shell-less hollow fiber gas permeators are disclosed wherein the hollow fibers are arranged in a bundle of paallel fibers embedded in a tube sheet at both ends. The tube sheets are fitted with caps to provide a pressure chamber which have ports for fluid communication. The end caps and tube sheets are mounted on a central rod to hold them rigidly in position. A plurality of the permeators are arranged in an array within an enclosure with ends in a common plane and the ends are in fluid communication with each other. The enclosure is provided with a vent and in a preferred aspect air is drawn over the permeators.

8 Claims, 5 Drawing Sheets

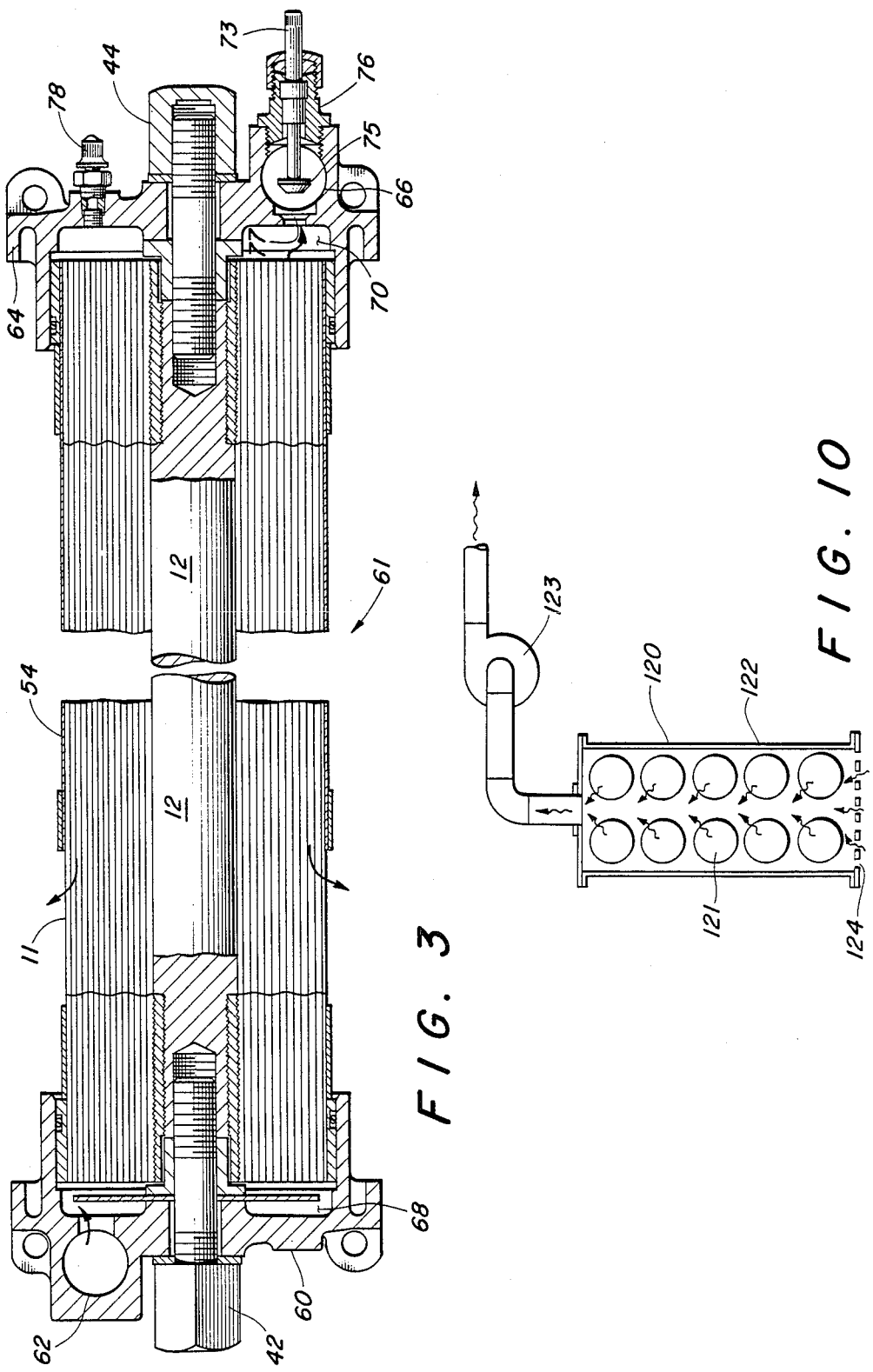

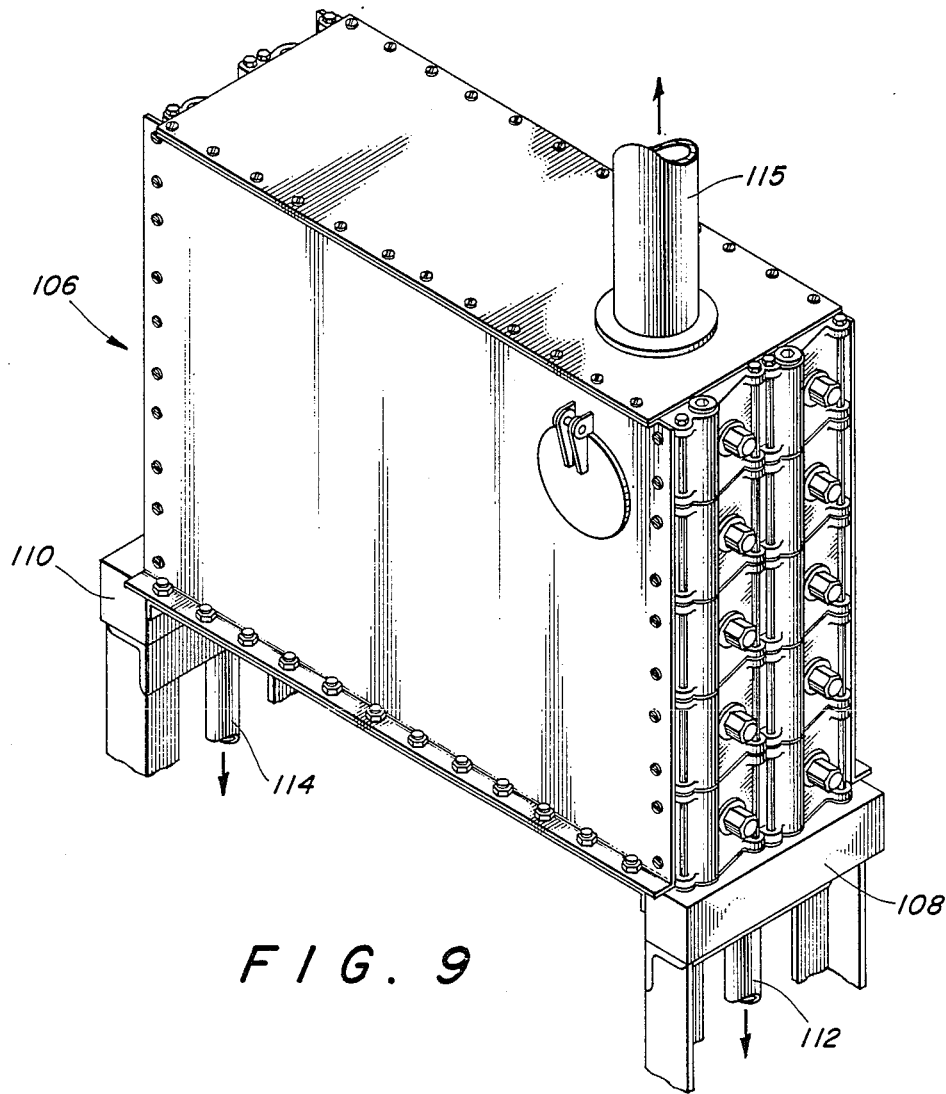
FIG. 9
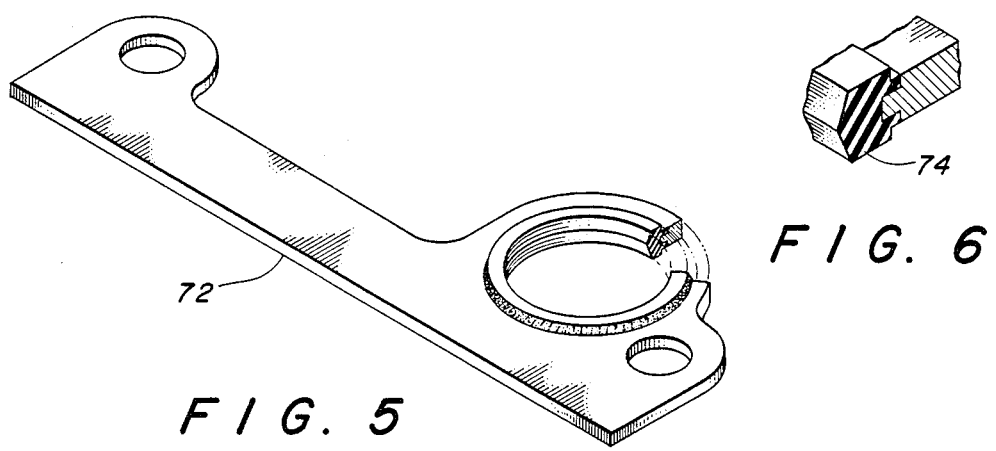
FIG. 5
FIG. 6

MODULAR, SHELL-LESS, AIR PERMEATOR

BACKGROUND OF THE INVENTION

The present invention relates to a hollow fiber bundle gas separation module and assembly of modules in which the gases to be separated are fed to the bores of the hollow fibers.

PRIOR ART

In most prior art permeators, a fiber bundle module is enclosed in a pressure vessel or a housing which contains all the elements of the module and provides support to the module, provides protection of the module elements and protects operators from possible failure of module elements such as the tube sheets In fact, the housings are an integral part of most prior art modules. Such housings add to the cost of the modules since they must be large, strong structures to contain all the other elements. Even in cases of tubesheet-feed permeators where the feed pressure is applied to the bores of the hollow fibers, the housing that contains the pressure at the tubesheet ends is extended to contain the entire bundle.

Also in most prior art modules fluid connection ports are required in the housing and there is no simple way disclosed to assemble a plurality of these modules in a cost effective enclosure to provide a high capacity permeator assembly. Nor is there disclosed a simple way to replace modules in a permeator assembly. In general the modules are treated as individual units that are just laid side-by-side in a bulky arrangement and at least three fluid connections must be made to each module for the feed, residue and permeate streams.

The shell-less permeator module and module assembly of the present invention provides an economical module design without requiring a housing as in the prior art, and the permeator module assembly provides a compact, low cost, flexible capacity permeator with minimal fluid connections required.

U.S. Pat. No. 4,568,579 discloses an asymmetrical hollow tube useful in separating nitrogen and oxygen from air in which the air is fed to the bores of the hollow tubes.

European Patent Application No. 0 204 424 discloses a gas separation apparatus in which the gas to be separated is fed to the bores of a plurality of asymmetrical hollow fibers.

SUMMARY OF THE INVENTION

The present invention is a low cost, tubeside-feed air separation permeator that comprises a fiber bundle module that has individual pressure chamber end caps on each tubesheet only; the individual fiber bundle is not enclosed by a pressure chamber, housing, container or the like. The tubesheet pressure chambers are connected one to the other by a support rod passing through the center of the bundle that gives the bundle structural rigidity and serves as a safety feature that restrains the permeator parts in case of tubesheet failure. In one embodiment the end caps are specially shaped and include a fluid manifold segment that joins other end cap manifold segments to form a common manifold on each end of the modules thereby decreasing external piping requirements, and there is a sample port and flow control valve integral with the cap at one end.

The invention is also a low cost tubeside-feed permeator assembly consisting of a plurality of fiber bundle modules that are assembled in a low cost, atmospheric pressure enclosure. The modules are individually supported in the enclosure in such a way that they can be easily removed for replacement. In one embodiment, the end caps have separate ports for making external fluid connections to each module. This has the advantage that a single module can be disconnected and removed without disturbing any other modules, however, separate external piping is required to the individual modules. In another embodiment using the end caps with manifold segments, the modules are stacked and the end caps are connected and sealed one to the other so for each assembly of modules only a single fluid connection need be made to each end of the assembly. This embodiment has the advantage that there is only a minimal amount of external piping required to the assembly, with no piping to individual modules, however, removing a module at the bottom of the assembly requires moving all the modules stacked above it.

BRIEF DESCRIPTION OF THE DRAWINGS

FIG. 3 is a cross-section taken on line 1—1 of FIG. 4.

FIG. 5 is a seal plate used to fit between two of the permeators shown in FIGS. 2-4.

FIG. 6 is a perspective section of the gasket from the seal plate shown in FIG. 5.

FIG. 9 is a perspective view of another permeator assembly of the present invention.

FIG. 10 is a sectional view of a permeator assembly of the present invention.

DETAILED DESCRIPTION OF THE INVENTION

Figure 1:
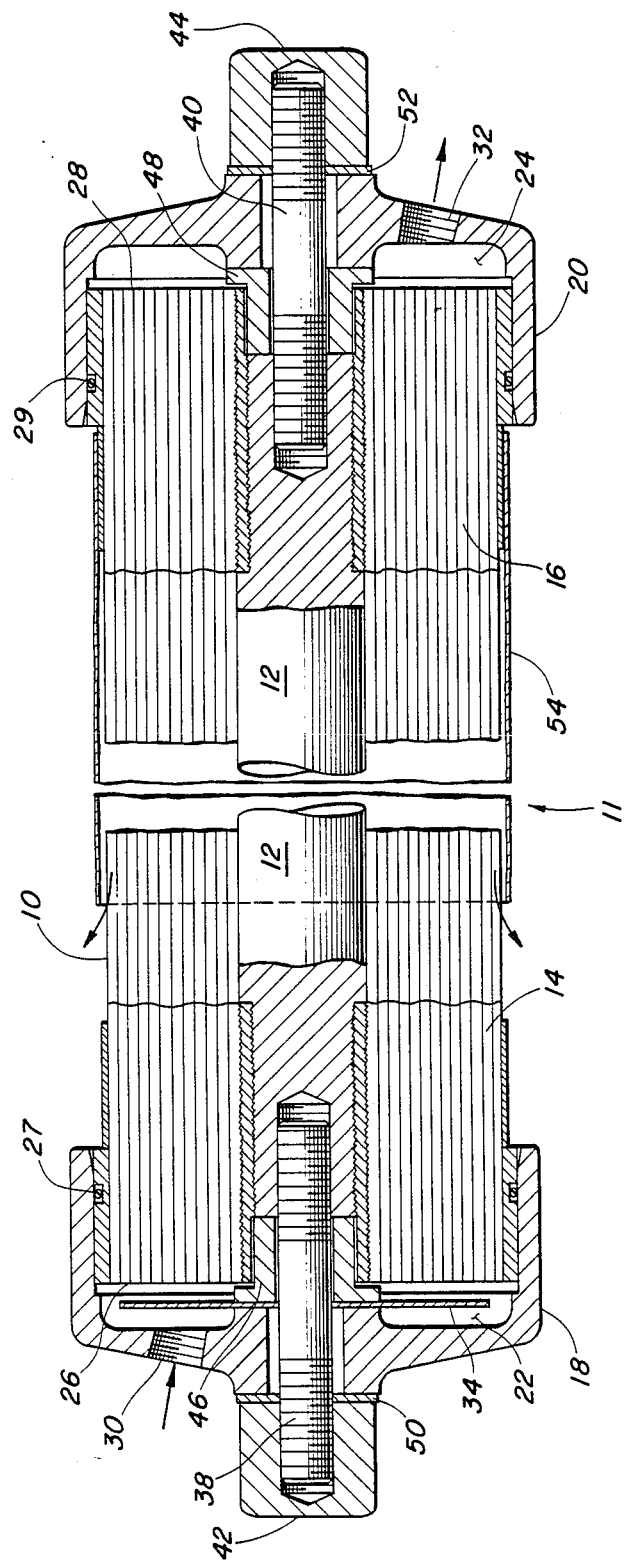
FIG. 1 is a cross-sectional view of a first embodiment of the present invention.

Referring now to FIG. 1, a first embodiment of the individual tubeside-feed, fiber bundle module is shown generally at 10. The fiber bundle 11 is built up around a central support rod 12 that extends partly through the end tubesheets 14 and 16. Each tubesheet has an individual pressure chamber end cap 18 and 20 that creates pressure chambers 22 and 24 between the inside of the end caps and the faces of the tubesheets 26 and 28 where the fiber bores are open. The chambers are sealed by "O-rings" 27 and 29 between the tubesheets and end caps. It is preferred that the pressure chamber volume be minimized so the compressed gas volume is kept below the level where it is necessary to meet certain pressure vessel codes which vary from country to country. Between the end cap port 30 and the tubesheet face 26, there is a baffle 34 that directs incoming fluid flow in a direction parallel to the face 26 to prevent high velocity erosion of the face. The end caps are retained on the fiber bundle by attachment to the center rod 12 by studs 38 and 40 and closed-end nuts 42 and 44. Spacers 46 and 48 permit the end caps to be drawn up tightly against the ends of rod 12 and gaskets 50 and 52 seal any fluid leakage around studs 38 and 40. The fiber bundle is preferably covered along a portion of its length with an over-wrap or sleeve 54 that serves to channel the permeate flow as will be described. The over-wrap can be a tape or film such as polyester film.

The end cap is shown in a sliding engagement with the tubesheet at each end of the fiber bundle. This is suitable for fiber bundles less than about 5 inches in diameter. At this small diameter the tubesheet is strong enough not to fail under pressure when only supported at the center rod 12. For fiber bundles greater than about 5 inches in diameter, additional support can be provided to the tubesheet by engaging the tubesheet and end cap in a threaded connection instead of the sliding one shown. Referring to FIG. 1, it can be appreciated that if a tubesheet, such as 16, structurally failed in a circumferential shear mode due to excess pressure in chamber 24, a toroidal section of tubesheet may move to the left in the figure. This section after leaving end cap 20, however, would still be retained on the module by rod 12 and would not become a dangerous projectile.

In operation as an air separation permeator selective to nitrogen, the feed gas, air, enters port 30 in end cap 18, flows around baffle 34, and enters the fiber bores in the face 26. As the air flows within fiber bundle 10, the oxygen in the air permeates through the fiber wall three to eight times more rapidly than the nitrogen. As the non-permeate residue stream in the fiber bores become depleted of oxygen, the permeate also becomes increasingly depleted of oxygen. If the oxygen-poor permeate on the outside of the fiber is channelled to flow back towards the left, counter to the feedstream, it has the effect of maximizing the difference in oxygen partial pressure across the fiber walls and thus the rate of oxygen permeation through the fiber walls. The net effect is to enhance permeator performance, either by increasing nitrogen purity in the residue stream at a fixed conversion (ratio of residue flow to feed flow) or by increasing conversion at a fixed purity The over-wrap 54, is used to promote such a counter-current flow of permeate within the fiber bundle.

The nitrogen-rich flow leaves the fiber bores at face 28 at the right end of the fiber bundle module 10. This is the residue which in this case is the desired product of the separation. The residue flows through chamber 24 and out port 32 in end cap 20 and is collected through suitable piping to a product collection manifold. The oxygen-rich permeate flows out from the left end of the bundle beyond the end of over-wrap 54 and is ducted into the atmosphere. The feed gas pressure can be typically 6 to 10 atmospheres, the residue pressure up to about 1 atmosphere less than the feed, and the permeate about 1 atmosphere, absolute. In the operation described, the residue stream is the desired product, but in other applications the product may be the permeate stream which can be collected by a low pressure enclosure around the permeator module as will be described referring to FIGS. 7, 8, and 9.

Figure 2:
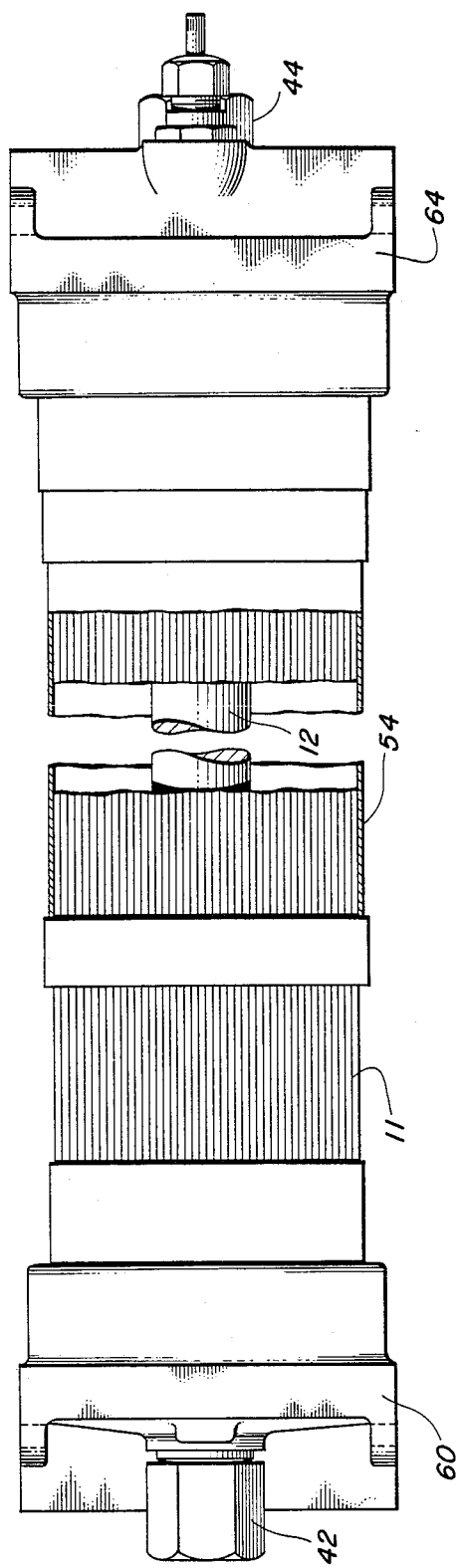
FIG. 2 is a plan view of a second embodiment of the present invention.

Referring now to FIG. 2 an alternate version of the fiber bundle module is shown where each of the end caps is provided with a fluid manifold segment. End cap 60 (FIG. 3) has manifold segment 62, and end cap 64 has segment 66 with the segments in fluid communication with chambers 68 and 70 respectively. The end caps are shaped to facilitate stacking of the modules one on the other with the manifold segment of one module in fluid communication with the manifold segment of the other. Sealing between manifold segments is achieved by a seal plate shown in FIG. 5 that has an elastomeric sealing element 74 shown in FIG. 6. The seal plate would be stacked between modules as will be discussed later referring to FIG. 8. The end cap 64 also has integral with the cap a flow control valve 76 that can restrict the fluid communication between chamber 70 and segment 66. By turning stem 73, plug 75 interacts with orifice 77 to restrict flow out of chamber 70 and therefore through the fiber bores of bundle 11. This makes possible trimming of the flow through individual fiber bundles of a multi-bundle permeator assembly so the nitrogen purity of each bundle module in an assembly can be balanced with other modules. Also shown in FIG. 2 is a sampling valve 78 in fluid communication with chamber 70 that permits sampling of the individual module residue fluid. Such a sampling valve resembles an automotive tire pressure valve stem assembly. A sampling valve could also be similarly added to the end cap 20 of module 10 in FIG. 1.

Figure 7:
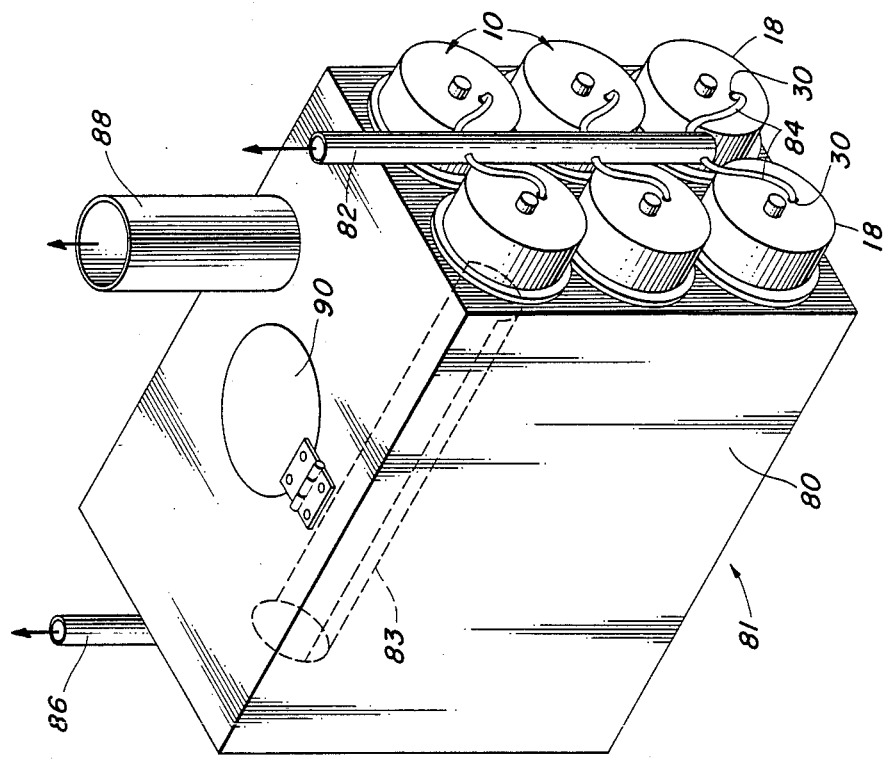
FIG. 7 is a perspective view of an assembly of the permeators of the present invention.

Referring now to FIG. 7 a preferred permeator assembly 81 is shown containing a plurality of modules 10 of the FIG. 1 embodiment. It consists of a low cost, essentially atmospheric pressure enclosure 80 with support troughs 83 into which the fiber bundle modules 10 are inserted. The modules are supported at the end caps 18 and 20, and are retained and sealed by rings 85 that engage the outer diameter of caps 18 and 20. The enclosure can be made of light gage sheet metal. The feed side end caps 18 are in fluid communication with a feed manifold 82 via ports 30 and connections 84 that are typical for all modules in the assembly. Similar connections are made with the residue end caps (not shown) at the opposite end of the enclosure. These connections permit fluid communication between the residue end caps and residue manifold 86 The permeate flowing through the fiber walls of each fiber bundle module is collected in the interior of the enclosure and ducted to the atmosphere through duct 88. There is a pressure relief 90 provided on the enclosure as a safety feature to provide additional venting on the non-pressure vessel enclosure in case of failure of a tubesheet or fiber bundle that may create high flow and a pressure rise in enclosure 80.

Figure 4:
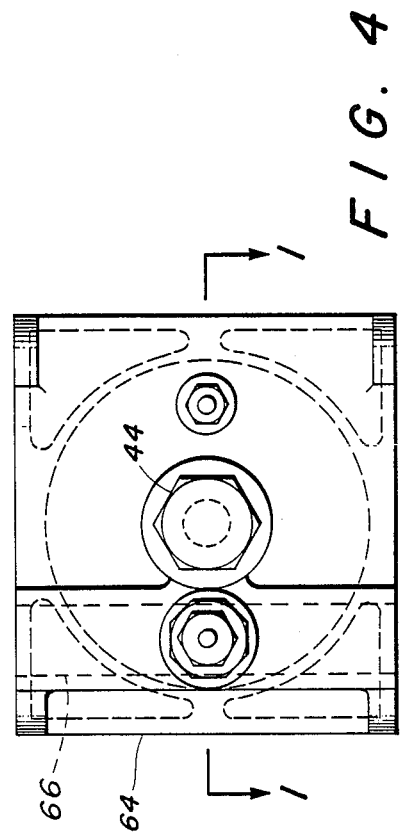
FIG. 4 is an end view of the permeator shown in FIG. 2.
Figure 8:
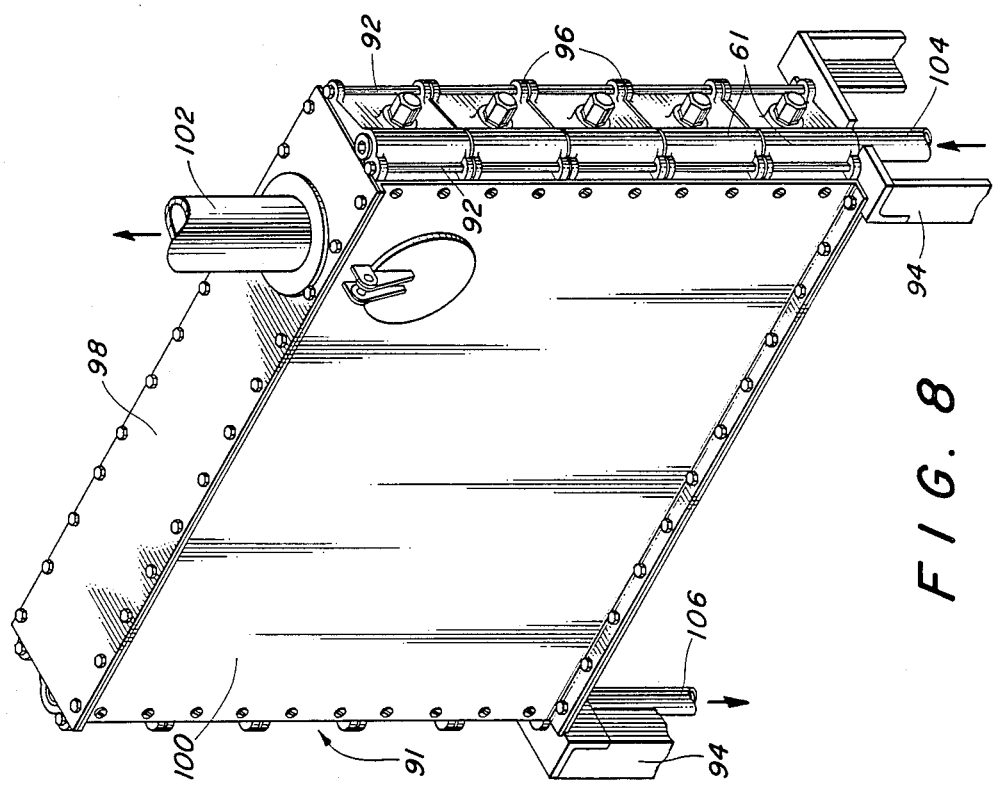
FIG. 8 is a perspective view of a permeator assembly of the present invention.

Referring now to FIG. 8 a preferred permeator assembly indicated generally at 91 containing a plurality of modules 61 of the FIGS. 2-4 embodiments is shown. It consists of a single vertical stack of modules that are fastened together by bolts 92 and seal plates 72 placed between the modules, such as at 96. The stack is shown also fastened to a support structure 94 on each end. Sheet metal panels, such as 98 and 100 are fastened to the sides and ends of the stack to enclose the fiber bundles and contain the permeate. The top end panel 98 has a duct 102 to carry the permeate away from the permeator. The side panel 100 has a pressure relief valve similar to that in the permeator assembly 81 in FIG. 7. The only external piping required in this permeator is the feed inlet connection 104 to the feed end of the stack, the residue or product outlet connection 106 to the residue end of the stack and the permeate outlet connection 102.

Referring now to FIG. 9 another variation of a permeator assembly indicated generally at 106 is shown using the module 61 of FIGS. 2-4. In this embodiment there are two stacks of modules placed side-by-side and bolted to manifold blocks 108 and 110. There are sheet metal sides and ends similar to the FIG. 8 assembly. The only external piping required in this permeator is the feed inlet connection 112 to the block 108 at the feed end of the stack, the residue or product outlet connection 114 to the block 110 at the end of the stack, and the permeate outlet connection 115.

Instead of providing individual enclosure panels as in FIGS. 8 and 9, alternatively a monolithic enclosure could completely surround the stack of permeator modules that would be mounted on a base plate. Removeable access ports could be provided to reach the flow control and sampling valves. To remove an individual module from the assembly, the monolithic enclosure could be rapidly removed to gain access to the module stack.

Referring now to FIG. 10 a preferred permeator assembly indicated generally at 120 is shown. In this embodiment there are two stacks of modules 121 mounted in a side-by-side relationship in a sheet metal enclosure 122. The permeate for the modules 121 is drawn upwardly through the permeator assembly 120 by means of blower 123 which produces a slightly sub-atmospheric pressure in the enclosure. It is also desireable to draw air into the permeator assembly 120 through screen 124. This arrangement has several advantages. First, no pressure relief valve is needed on the sheet metal housing 122 because one side is always open to the atmosphere. Second, the permeate which may be near the dew point is diluted with ambient air, thus preventing possible condensation. Third, there is no leakage of oxygen-rich air (a possible fire hazard) into the space surrounding the permeator assembly if a module is to be removed for replacement during operation (by valving off individual connections to the manifolds) or if the sealing around the module end caps or enclosure joints is imperfect. If a flow of ambient air is not desired, screen 124 may be replaced with a solid panel. Blower 123 may also be beneficially added to the permeator assemblies of FIGS. 7, 8, and 9.

It is advantageous that one basic module size can be joined to other modules in a simple assembly to provide any size permeator. Only a single enclosure is needed for each permeator assembly thus saving the cost of individual module containers. In both permeator embodiments shown, the permeate piping is simplified to a single outlet for any number of modules in a permeator assembly. In the permeator assemblies using modules with the shaped end caps having integral manifold segments, the piping is further simplified to three connections for any number of modules in a permeator assembly.

I claim:

1. A shell-less gas permeator comprising an elongated bundle of hollow fibers having a tubesheet on both ends, end caps enclosing both tubesheets and forming pressure chambers in combination with said hollow fibers, the first chamber being an inlet and the second chamber being a residue gas outlet, a support rod in the center of the bundle of hollow fibers passing through and rigidly attached to each tubesheet and end cap, and a passage establishing fluid communication between the outside of each end cap and the chamber within such cap.

2. The permeator of claim 1 wherein the end caps are adapted for stacking with a similar permeator and the passage in one end cap is a manifold segment adapted to communicate with a similar manifold in an adjacent end cap.

3. An assembly of permeators of claim 2 comprising a plurality of such permeators arranged in a parallel array with the ends of said permeators arranged in the same plane, means to enclose the array of permeators, means to establish communication between the ends of the permeators in the same plane, thereby establishing a common feed inlet and a common residue outlet and means to vent the enclosure thereby establishing a permeate outlet.

4. The assembly of permeators of claim 3 wherein the outlet is provided with means to provide a sub-atmospheric pressure in the enclosure means.

5. An assembly of permeators of claim 1 comprising a plurality of such permeators arranged in a parallel array with the ends of said permeators arranged in the same plane, means to enclose the array of permeators, means to establish communication between the ends of the permeators in the same plane, thereby establishing a common feed inlet and common residue outlet and means to vent the enclosure thereby establishing a permeate outlet.

6. The assembly of permeators of claim 5 wherein the outlet is provided with means to provide a sub-atmospheric pressure in the enclosure means.

7. The permeator of claim 1 further comprising a baffle positioned in the first chamber to direct fluid flow parallel to the face of the tubesheet.

8. A shell-less fluid permeator comprising an elongated bundle of hollow fibers having a tubesheet on both ends, an end cap enclosing both tubesheets and forming a pressure chamber, the first chamber being an inlet and the second chamber being a residue fluid outlet, a support rod in the center of the bundle of hollow fibers rigidly attached to each tubesheet and end cap, and a passage establishing fluid communication between the outside of each end cap and chamber within such cap.

* * * * *

UNITED STATES PATENT AND TRADEMARK OFFICE
CERTIFICATE OF CORRECTION

PATENT NO. : 4,871,379
DATED      : October 3, 1989
INVENTOR(S) : Donald W. Edwards It is certified that error appears in the above—identified patent and that said Letters Patent is hereby corrected as shown below:

Column 6, line 26, the claim reference numeral "1", should read -- 2 --.

Signed and Sealed this

Twenty-eighth Day of August, 1990

Attest:

HARRY F. MANBECK, JR.

*Attesting Officer*     *Commissioner of Patents and Trademarks*